United States Patent
Baron et al.

(10) Patent No.: US 10,028,306 B2
(45) Date of Patent: Jul. 17, 2018

(54) METHOD AND DEVICE FOR DATA COMMUNICATION IN A NETWORK

(71) Applicant: CANON KABUSHIKI KAISHA, Tokyo (JP)

(72) Inventors: Stéphane Baron, Le Rheu (FR); Romain Guignard, Rennes (FR); Pascal Viger, Janze (FR)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/837,126

(22) Filed: Aug. 27, 2015

(65) Prior Publication Data
US 2016/0066208 A1 Mar. 3, 2016

(30) Foreign Application Priority Data

Aug. 28, 2014 (GB) .................................. 1415256.5

(51) Int. Cl.
*H04W 74/08* (2009.01)
(52) U.S. Cl.
CPC ................................ *H04W 74/085* (2013.01)
(58) Field of Classification Search
CPC ..... H04W 28/14; H04W 28/22; H04W 28/26; H04W 72/12; H04W 72/1242; H04W 74/085; H04W 84/12; H04W 72/10; H04W 72/413; H04W 74/08; H04W 74/0816; H04W 28/0289; H04W 76/007; H04L 12/413; H04L 12/40143; H04L 47/14; H04L 47/24; H04L 69/02; H04L 47/2433
See application file for complete search history.

(56) References Cited

U.S. PATENT DOCUMENTS

| | | | | |
|---|---|---|---|---|
| 5,717,889 A | * | 2/1998 | Rettig | ................... H04L 12/413 370/447 |
| 6,246,702 B1 | * | 6/2001 | Fellman | .............. H04L 12/6418 370/354 |
| 6,430,192 B1 | * | 8/2002 | Creedon | ............. H04L 12/4015 370/428 |
| 6,661,804 B2 | * | 12/2003 | Fellman | .............. H04L 12/6418 370/420 |

(Continued)

FOREIGN PATENT DOCUMENTS

| | | | | |
|---|---|---|---|---|
| GB | 2529672 A | * | 3/2016 | .......... H04W 74/085 |
| WO | 2012030852 A1 | | 3/2012 | |

*Primary Examiner* — Eric Nowlin
(74) *Attorney, Agent, or Firm* — Canon U.S.A., Inc. IP Division

(57) ABSTRACT

The invention relates to a communication device and a method of sending data over a communication network. The communication device includes a controller for accessing the network using contention type access mechanism based on computation of back-off values, and includes a plurality of traffic queues for serving data traffic at different priorities. The controller includes a plurality of back-off engines, each associated with one traffic queue and configured to compute a back-off value in accordance with the priority of the associated traffic queue. One or more back-off engine may be adjusted to prevent the back-off value of such back-off engine to reach zero. When an access to the network is obtained for the device. a traffic queue may be selected based on its associated back-off value, and data may be transmitted from the selected traffic queue.

19 Claims, 8 Drawing Sheets

(56) References Cited

U.S. PATENT DOCUMENTS

| | | | | |
|---|---|---|---|---|
| 6,965,942 B1* | 11/2005 | Young | H04W 74/085 | 370/447 |
| 7,043,573 B2* | 5/2006 | Ito | G06F 13/387 | 710/105 |
| 7,082,472 B1* | 7/2006 | Feder | H04L 12/413 | 370/235 |
| 7,170,904 B1* | 1/2007 | Chang | H04L 12/5601 | 370/329 |
| 7,233,603 B2* | 6/2007 | Lee | H04L 47/10 | 370/444 |
| 7,280,554 B2* | 10/2007 | Moutarlier | H04W 74/085 | 370/235 |
| 7,489,666 B2* | 2/2009 | Koo | H04W 72/1242 | 370/332 |
| 7,616,612 B2* | 11/2009 | Koo | H04W 72/1242 | 370/332 |
| 7,852,764 B2* | 12/2010 | Yamaguchi | H04B 7/15592 | 370/231 |
| 7,881,340 B2* | 2/2011 | Farrag | H04W 74/02 | 370/468 |
| 8,737,425 B2* | 5/2014 | Wang | H04W 74/0875 | 370/349 |
| 8,774,033 B2* | 7/2014 | Oh | H04W 74/0833 | 370/252 |
| 8,867,518 B2* | 10/2014 | Benveniste | H04W 74/0816 | 370/342 |
| 8,929,219 B2* | 1/2015 | Seok | H04L 47/10 | 370/235 |
| 9,332,069 B2* | 5/2016 | Aahlad | H04L 67/1048 | |
| 9,635,559 B2* | 4/2017 | Sadek | H04W 16/08 | |
| 2001/0002195 A1* | 5/2001 | Fellman | H04L 12/6418 | 370/420 |
| 2002/0032812 A1* | 3/2002 | Ito | G06F 13/387 | 710/59 |
| 2002/0188750 A1* | 12/2002 | Li | H04W 74/085 | 709/235 |
| 2004/0028072 A1* | 2/2004 | Moutarlier | H04W 74/085 | 370/448 |
| 2004/0151144 A1* | 8/2004 | Benveniste | H04M 11/04 | 370/336 |
| 2004/0185853 A1* | 9/2004 | Kim | H04W 36/0083 | 455/438 |
| 2004/0186907 A1* | 9/2004 | Wentink | H04W 74/085 | 709/225 |
| 2004/0219926 A1* | 11/2004 | Kim | H04W 36/0088 | 455/452.2 |
| 2005/0025176 A1* | 2/2005 | Ko | H04W 74/085 | 370/448 |
| 2005/0030931 A1* | 2/2005 | Sung | H04J 3/0682 | 370/342 |
| 2005/0141480 A1* | 6/2005 | Jin | H04L 12/4625 | 370/351 |
| 2005/0141548 A1* | 6/2005 | Koo | H04W 72/1242 | 370/462 |
| 2005/0152373 A1* | 7/2005 | Ali | H04L 47/10 | 370/395.4 |
| 2006/0050742 A1* | 3/2006 | Grandhi | H04W 74/0816 | 370/506 |
| 2006/0062189 A1* | 3/2006 | Takeuchi | H04W 74/0875 | 370/338 |
| 2006/0114823 A1* | 6/2006 | Flemming | H04W 74/0808 | 370/229 |
| 2007/0074090 A1* | 3/2007 | Trainin | H04W 74/0875 | 714/746 |
| 2007/0195787 A1* | 8/2007 | Alnuweiri | H04L 47/10 | 370/395.4 |
| 2008/0144550 A1* | 6/2008 | Makhlouf | H04L 1/1825 | 370/310 |
| 2008/0267162 A1* | 10/2008 | Benveniste | H04W 74/0816 | 370/347 |
| 2008/0279210 A1* | 11/2008 | Naka | H04W 28/18 | 370/448 |
| 2009/0040974 A1* | 2/2009 | Goldhamer | H04W 74/02 | 370/329 |
| 2009/0310620 A1* | 12/2009 | Yoshizawa | H04L 12/413 | 370/461 |
| 2010/0020689 A1* | 1/2010 | Tang | H04L 47/10 | 370/235 |
| 2010/0081394 A1* | 4/2010 | Mashimo | H04W 16/14 | 455/70 |
| 2010/0135319 A1* | 6/2010 | Wang | H04W 74/0875 | 370/445 |
| 2010/0165846 A1* | 7/2010 | Yamaguchi | H04B 7/15592 | 370/236 |
| 2010/0189024 A1* | 7/2010 | Xhafa | H04W 76/048 | 370/311 |
| 2011/0235513 A1* | 9/2011 | Ali | H04L 47/10 | 370/232 |
| 2012/0008490 A1 | 1/2012 | Zhu | | |
| 2012/0076074 A1* | 3/2012 | Park | H04W 74/0833 | 370/328 |
| 2012/0127874 A1* | 5/2012 | Oh | H04W 74/0833 | 370/252 |
| 2012/0314694 A1* | 12/2012 | Hsieh | H04W 74/085 | 370/338 |
| 2013/0034059 A1* | 2/2013 | Lee | H04W 74/006 | 370/328 |
| 2013/0183906 A1* | 7/2013 | Tavildar | H04W 56/002 | 455/67.11 |
| 2013/0235721 A1* | 9/2013 | Nguyen | H04L 1/1825 | 370/230 |
| 2013/0337749 A1* | 12/2013 | Wang | H04W 4/008 | 455/41.2 |
| 2014/0003367 A1* | 1/2014 | Viger | H04W 74/0816 | 370/329 |
| 2014/0079046 A1* | 3/2014 | Yang | H04W 74/0825 | 370/338 |
| 2014/0133495 A1* | 5/2014 | Viger | H04W 74/0816 | 370/442 |
| 2014/0153463 A1* | 6/2014 | Park | H04W 52/0216 | 370/311 |
| 2014/0153514 A1* | 6/2014 | Nezou | H04W 74/0816 | 370/329 |
| 2014/0189004 A1* | 7/2014 | Aahlad | H04L 67/1048 | 709/204 |
| 2014/0219256 A1* | 8/2014 | Viger | H04W 74/00 | 370/336 |
| 2014/0313949 A1* | 10/2014 | Lilleberg | H04L 5/1469 | 370/280 |
| 2015/0163681 A1* | 6/2015 | Sadek | H04W 16/08 | 455/446 |
| 2015/0237654 A1* | 8/2015 | Park | H04W 74/0816 | 370/329 |
| 2015/0264711 A1* | 9/2015 | Lampin | H04W 74/08 | 370/336 |
| 2015/0296321 A1* | 10/2015 | Kim | H04W 8/02 | 370/329 |
| 2015/0373485 A1* | 12/2015 | Chung | H04W 48/10 | 455/41.2 |
| 2016/0014807 A1* | 1/2016 | Ghosh | H04L 5/0048 | 370/329 |
| 2016/0066208 A1* | 3/2016 | Baron | H04W 74/085 | 370/230 |
| 2016/0073340 A1* | 3/2016 | Xue | H04W 52/0212 | 455/522 |
| 2016/0081114 A1* | 3/2016 | Jung | H04W 72/04 | 370/329 |
| 2016/0255570 A1* | 9/2016 | Fang | H04W 48/12 | |
| 2016/0262185 A1* | 9/2016 | Ghosh | H04W 72/04 | |
| 2016/0278088 A1* | 9/2016 | Cheng | H04W 47/27 | |
| 2017/0013533 A1* | 1/2017 | Felemban | H04L 12/6418 | |
| 2017/0026465 A1* | 1/2017 | Aahlad | H04L 67/1048 | |
| 2017/0054625 A1* | 2/2017 | Osborne | H04L 45/021 | |
| 2017/0303314 A1* | 10/2017 | Cariou | H04L 43/16 | |

\* cited by examiner

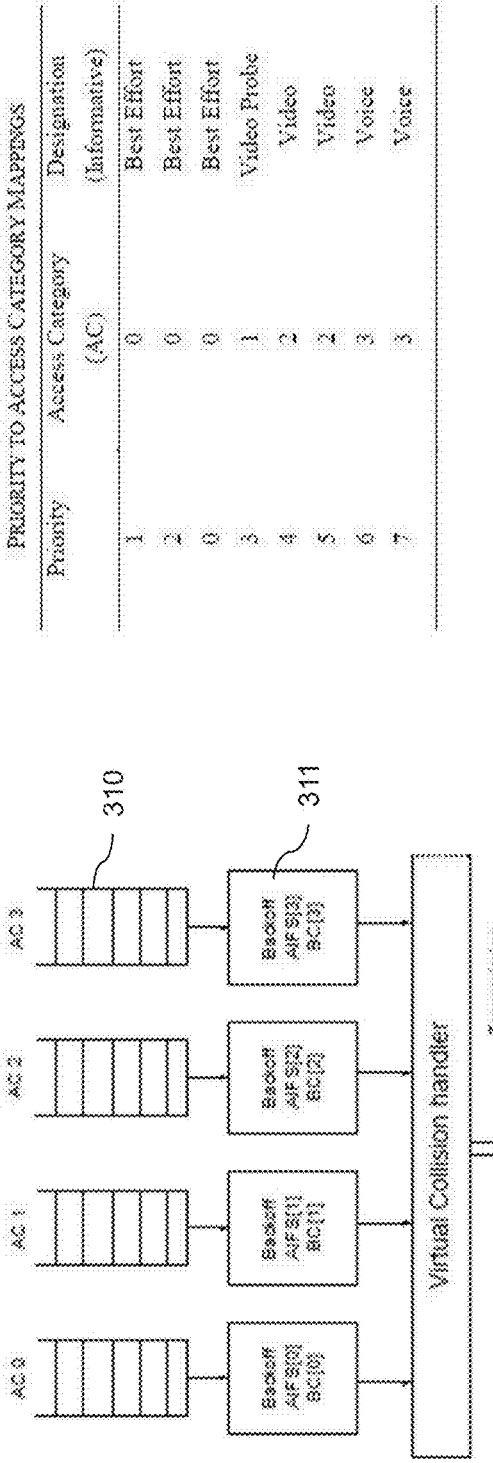
Fig. 3a
Fig. 3b
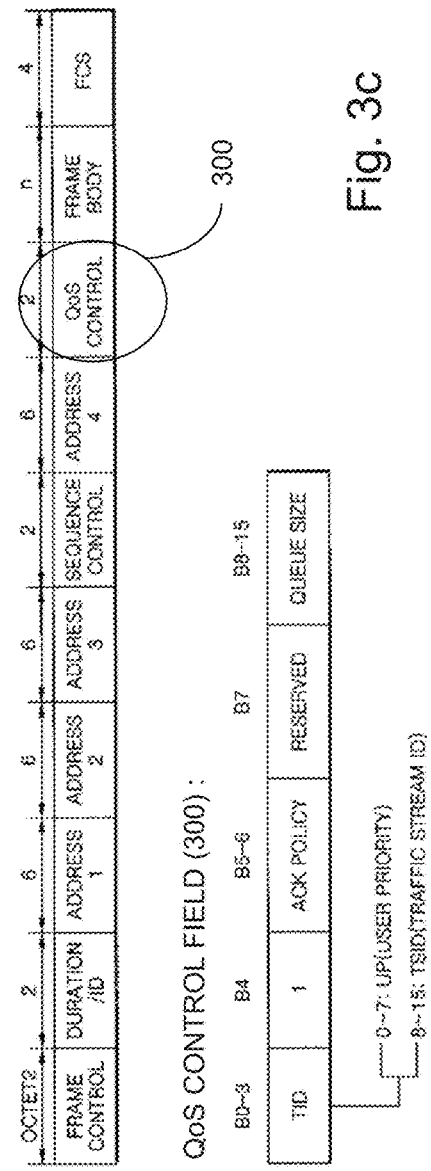
Fig. 3c

METHOD AND DEVICE FOR DATA COMMUNICATION IN A NETWORK

This application claims the benefit under 35 U.S.C. § 119(a)-(d) of United Kingdom Patent Application No. 1415256.5, filed on Aug. 28, 2014 and entitled "METHOD AND DEVICE FOR DATA COMMUNICATION IN A NETWORK". The above cited patent application is incorporated herein by reference in its entirety.

FIELD OF THE INVENTION

The present invention relates generally to communication networks and more specifically to methods and devices for data communication over a network, the network being accessible by communication devices using a contention type access mechanism.

BACKGROUND OF THE INVENTION

Many wireless local area networks (WLANs), such as wireless communication networks using Carrier Sense Multiple Access with Collision Avoidance (CSMA/CA), are founded on the principle of collision avoidance. Such networks may also conform to a communication standard such as a communication protocol of 802.11 type e.g. Medium Access Control (MAC).

The IEEE 802.11 MAC standard defines the way WLANs must work at the physical and medium access control (MAC) level. Typically, the 802.11 MAC (Medium Access Control) implements the well-known Distributed Coordination Function (DCF) which relies on a contention-based mechanism based on the so-called "Carrier Sense Multiple Access with Collision Avoidance" (CSMA/CA) technique.

The 802.11 medium access protocol standard is mainly directed to the management of communication nodes waiting for the medium to become idle so as to try to access the medium.

FIG. 1 illustrates a communication system in which several communication nodes exchange data frames over a radio transmission channel 100 of a wireless local area network (WLAN).

Access to the shared radio medium to send data frames is based on the CSMA/CA technique, for sensing the carrier and avoiding collision by separating concurrent transmissions in space and time.

Carrier sensing in CSMA/CA is performed by both physical and virtual mechanisms. Virtual carrier sensing is achieved by transmitting control frames to reserve the medium prior to transmission of data frames.

Then a transmitting or source node first attempts through the physical mechanism, to sense a medium that has been idle for at least one DIFS (standing for DCF InterFrame Spacing) time period, before transmitting data frames.

However, if it is sensed that the shared radio medium is busy during the DIFS period, the transmitting node continues to wait until the radio medium becomes idle. To do so, it starts a countdown back-off counter designed to expire after a number of timeslots, chosen randomly in the interval [0,CW], CW (integer) being referred to as the Contention Window. This back-off mechanism or procedure is the basis of the collision avoidance mechanism that defers the transmission time for a random interval, thus reducing the probability of collisions on the shared channel. After the back-off time period, the transmitting node may send data or control frames if the medium is idle.

One problem of wireless data communications is that it is not possible for the transmitting node to listen while sending, thus preventing the transmitting node from detecting data corruption due to channel fading or interference or collision phenomena. A transmitting node remains unaware of the corruption of the data frames sent and continues to transmit the frames unnecessarily, thus wasting access time.

The Collision Avoidance mechanism of CSMA/CA thus provides positive acknowledgement (ACK) of the sent data frames by the receiving node if the frames are received successfully, to notify the transmitting node that no corruption of the sent data frames occurred.

The ACK is transmitted at the end of reception of the data frame, immediately after a period of time called Short InterFrame Space (SIFS).

If the transmitting node does not receive the ACK within a specified ACK timeout or detects the transmission of a different frame on the channel, it may infer data frame loss. In that case, it generally reschedules the frame transmission according to the above-mentioned back-off procedure. However, this can be seen as a bandwidth waste if only the ACK has been corrupted but the data frames were correctly received by the receiving node.

To improve the Collision Avoidance efficiency of CSMA/CA, a four-way handshaking mechanism is optionally implemented. One implementation is known as the RTS/CTS exchange, defined in the 802.11 standard.

The RTS/CTS exchange consists in exchanging control frames to reserve the radio medium prior to transmitting data frames during a transmission opportunity called TXOP in the 802.11 standard as described below, thus protecting data transmissions from any further collisions.

As explained before, a back-off procedure is implemented in the communication nodes.

FIG. 2 illustrates the behaviour of three groups of nodes during a conventional communication over the 802.11 medium: transmitting or source node 20, receiving or addressee or destination node 21 and other nodes 22 not involved in the current communication.

Upon starting the back-off process 270 prior to transmitting data, a station e.g. transmitting node 20, initializes its back-off time counter to a random value as explained above. The back-off time counter is decremented once every timeslot interval 260 for as long as the radio medium is sensed idle (countdown starts from T0, 23 as shown in the Figure).

The time unit in the 802.11 standard is the slot time called 'aSlotTime' parameter. This parameter is specified by the PHY (physical) layer (for example, aSlotTime is equal to 9 µs for the 802.11n standard). All dedicated space durations (e.g. back-off) are multiples of this time unit.

The back-off time counter is 'frozen' or suspended when a transmission is detected on the radio medium channel (countdown is stopped at T1, 24 for other nodes 22 having their back-off time counter decremented).

The countdown of the back-off time counter is resumed or reactivated when the radio medium is sensed idle anew, after a DIFS time period. This is the case for the other nodes at T2, 25 as soon as the transmission opportunity TXOP granted to transmitting node 20 ends and the DIFS period 28 elapses. DIFS 28 (DCF inter-frame space) thus defines the minimum waiting time for a transmitting node before trying to transmit some data. In practice, DIFS=SIFS+2*aSlot-Time.

When the back-off time counter reaches zero (26) at T1, the timer expires, the corresponding node 20 will request access onto the medium in order to be granted a TXOP, and the back-off time counter is reinitialized 29 using a new random back-off value.

In the example of the Figure implementing the RTS/CTS scheme, at T1, the transmitting node 20 that wants to transmit data frames 230 sends a special short frame or message acting as a medium access request to reserve the radio medium, instead of the data frames themselves, just after the channel has been sensed idle for a DIFS or after the back-off period as explained above.

The medium access request is known as a Request-To-Send (RTS) message or frame. The RTS frame generally includes the address of the receiving node ("destination 21") and the duration for which the radio medium is to be reserved for transmitting the control frames (RTS/CTS) and the data frames 230. One can note that the RTS frame does not contain any indication about the pending data traffic (e.g. type of data or category, traffic identifier, etc.) to be further sent in the data frame 230.

Upon receiving the RTS frame and if the radio medium is sensed as being idle, the receiving node 21 responds, after a SIFS time period 27 (for example, SIFS is equal to 16 μs for the 802.11n standard), with a medium access response, known as a Clear-To-Send (CTS) frame. The CTS frame indicates the remaining time required for transmitting the data frames, computed from the time point at which the CTS frame starts to be sent.

The CTS frame is considered by the transmitting node 20 as an acknowledgment of its request to reserve the shared radio medium for a given time duration. A successful RTS/CTS handshake shows that the source station has gained a TXOP onto the wireless medium.

Thus, the transmitting node 20 expects to receive a CTS frame 220 from the destination node 21 before sending data 230 using unique and unicast (one source address and one addressee or destination address) frames.

The transmitting node 20 is thus allowed to send the data frames 230 upon correctly receiving the CTS frame 220 and after a new SIFS time period 27. In IEEE 802.11, the data are sent as MAC (Medium Access Control) Service Data Units (MSDUs) encapsulated into MAC Protocol Data Units (MPDUs).

An ACK frame 240 is sent by the receiving node 21 after having correctly received the data frames sent, after a new SIFS time period 27.

If the transmitting node 20 does not receive the ACK 240 within a specified ACK Timeout (generally within the TXOP), or if it detects the transmission of a different frame on the radio medium, it reschedules the frame transmission according to the back-off procedure.

Since the RTS/CTS four-way handshaking mechanism 210/220 is optional in the 802.11 standard, it is possible for the transmitting node 20 to send data frames 230 immediately upon its back-off time counter reaching zero (i.e. at T1).

The requested time duration for transmission defined in the RTS and CTS frames defines the length of the granted transmission opportunity TXOP, and can be read by any listening node ("other nodes 22" in FIG. 2) in the radio network.

To do so, each node has in memory a data structure known as the network allocation vector or NAV to store the time duration for which it is known that the medium will be busy. When listening to a control frame (RTS 210 or CTS 220) not addressed to itself, a listening node 22 updates its NAVs (NAV 255 associated with RTS and NAV 250 associated with CTS) with the requested transmission time duration specified in the control frame. The listening node 22 thus keeps in memory the time duration for which the radio medium will remain busy.

Access to the radio medium for the other nodes 22 is consequently deferred 30 by suspending 31 their associated timer and then by later resuming 32 the timer when the NAV has expired. Reference 30 represents the TXOP bounded period wherein source station can exchange data with destination station.

This prevents the listening nodes 22 from transmitting any data or control frames during that period.

It is possible that the destination node 21 does not receive the RTS frame 210 correctly due to a message/frame collision or to fading. Even if it does receive it, the destination node 21 may not always respond with a CTS 220 because, for example, its NAV is set (i.e. another node has already reserved the medium). In any case, the transmitting node 20 enters into a new back-off procedure.

The RTS/CTS four-way handshaking mechanism is very efficient in terms of system performance, in particular with regard to large frames since it reduces the length of the messages involved in the contention process.

In detail, assuming perfect channel sensing by each communication node, collision may only occur when two (or more) frames are transmitted within the same timeslot after a DIFS 28 (DCF inter-frame space) or when their own back-off counter has reached zero nearly at the same time T1. If both transmitting nodes use the RTS/CTS mechanism, this collision can only occur for the RTS frames. Fortunately, such collision is early detected by the transmitting nodes since it is quickly determined that no CTS response has been received. As described above, the original IEEE 802.11 MAC always sends an acknowledgement (ACK) frame 240 after each data frame 230 received.

However collisions limit the optimal functioning of the radio network. In particular, simultaneous transmit attempts from a number of wireless stations lead to collisions. The back-off procedure for the family of IEEE 802.11 standards was first introduced for the DCF mode as the basic solution for collision avoidance, and further employed by the IEEE 802.11e to solve the problem of internal collisions between enhanced distributed channel access functions (EDCAFs). In the emerging IEEE 802.11n/ac standards, the back-off procedure is still used as the fundamental approach for supporting distributed access among mobile stations. The EDCA extends the legacy DCF function to provide a service differentiation and prioritization mechanism. This mechanism is still based on CSMA/CA, but also introduces Arbitration IFS (AIFS) to offer several levels of priority. Thus, the EDCA mechanism is limited to a "soft" QoS, i.e. traffic prioritization. Therefore, the DCF does not provide an effective QoS mechanism but rather a kind of "best effort" mechanism. The EDCA mechanism appears effective for traffic classes with different priorities. However, for nodes having several classes of traffic, several back-off mechanisms are handled in parallel thus leading to increased collision risks. Moreover, for the nodes having the same class of traffic, no priority is provided. These aspects will be further described with reference to FIG. 3.

One important drawback of the random back-off procedure lies in that, it is not possible to determine the exact instant when the medium will be granted for sending data. This generates jitter in the medium access delay and so in the latency. The latency being defined as the time elapsed between the instant when a data unit is provided by the upper layer (typically the IP layer for instance) and the time this data unit is received on the remote node and transmitted to the application, the latency is thus the sum of the medium access delay, the transmission time, and the processing time. Since transmission and processing time can be considered constant (as depending only on the amount of data to transmit), the jitter is mainly introduced by the medium access delay which is not constant.

To reduce the jitter, some bandwidth sharing mechanisms have been applied in order to make several nodes talk successively when a medium access is granted to one of the nodes. This mechanism, known as TDMA (Time Division Multiple Access), allows each node to send data in a dedicated timeslot inside the TXOP each time a node supporting this technology accesses the medium. The node requesting the medium access will be called in the following, the "active node", while the nodes sending data in the timeslots provided by the active node will be called "passive nodes".

Using a TDMA transmission scheme inside the granted transmission opportunity TXOP significantly reduces the jitter, even if the medium access has been performed via a CSMA/CA (e.g. DCF) mechanism. However, the usage of the EDCA is not compatible with a TDMA mechanism for the following reason. In the EDCA medium access mechanism, a node tries to access the medium when one of its back-off counters, each associated with a different priority level, reaches zero. In a TDMA based transmission scheme, a passive node can obtain an opportunity to send data on the medium in a given timeslot provided by the active node, regardless of possible back-off values of the EDCA mechanism run by the passive node. Therefore, passive nodes already enrolled in a TDMA transmission still may trigger a request for accessing the network through the EDCA mechanism. In such a situation, conflicts in operation between the access mechanism and the transmission mechanism arise, which may deteriorate the communication.

The present inventors have thus considered the problem of how to manage traffic classification per priority, as EDCA mechanism, within a TDMA transmission scheme.

Conventional TDMA schedules transmission opportunities for different nodes of a TDMA group. Usually, the TDMA requires a central coordinator which starts the TDMA sequence, each node being registered to the central coordinator. Based on the information given by the node during registration, the central coordinator schedules a timeslot during which the registered nodes will send their data. In addition, the registration is usually performed for a dedicated traffic and the timeslot is thus specific to this traffic, which results in considering only one data queue as a source for filling in the scheduled timeslot. However, such scheduling is not compliant with the randomized data sending order defined by the 802.11e EDCA standard.

It is an aim of the present invention to provide a mechanism efficiently managing traffic classification per priority (as an EDCA mechanism) while using a time division multiple access (TDMA) transmission mechanism. A medium access mechanism of a deterministic type may also be used in order to obtain a transmission opportunity TXOP over a communication network. The proposed solutions are particularly, but not exclusively, suited for ad-hoc communication networks.

The present invention has been devised to address at least one of the foregoing concerns as well as their combination.

SUMMARY OF THE INVENTION

According to a first aspect of the invention there is provided a communication device for communication network, comprising:

a controller for accessing the communication network using contention type access mechanism based on computation of back-off values;
a plurality of traffic queues for serving data traffic at different priorities;
the controller comprising a plurality of back-off engines, each associated with one traffic queue and configured to compute a back-off value in accordance with the priority of the associated traffic queue;
means for adjusting at least one of the plurality of back-off engines, thereby preventing the back-off value of the at least one back-off engine to reach zero;
and when an access to the network is obtained for the device:
means for selecting a traffic queue based on its associated back-off value; and
means for transmitting data from the selected traffic queue.

The access to the medium will therefore be controlled by preventing the communication device to trigger an access request to the communication network. Any access to the medium is prevented for transmitting the data comprised in the traffic queues until an access to the network is obtained by an active device.

These features allow to use only the traffic classification per priority mechanism (EDCA prioritization) while inhibiting the medium access mechanism (EDCA channel access). They further allow to use a traffic classification per priority mechanism (as EDCA prioritization) for filling a granted transmission opportunity (as TDMA transmission slot). Moreover, the active node which grants the access to the device is not required to inform of the traffic queue to be used, allowing using standard messages for medium access by the active node.

According to an embodiment, the means for selecting a traffic queue is configured to select the traffic queue having the lowest associated back-off value. This feature allows to simply select the traffic queue according to its priority level.

According to another embodiment, the means for selecting a traffic queue is configured to select at least one further traffic queue according to the duration of the timeslot allocated for the transmission. This feature allows to optimize the filling level of said timeslot. Indeed the size of a timeslot obtained for the transmission may be much greater than the amount of data to be transmitted by the first selected traffic queue.

According to still another embodiment, the adjusting means comprises means for applying one or more offset values for adjusting the at least one adjustable back-off unit. This allows to control the priority order of the traffic queues. In particular, using the same offset value for all the adjustable back-off units allows keeping the priority order provided by traffic classification per priority mechanism in a simple way.

More specifically, the access to the network is obtained by another device and the offset value is/are determined based on a back-off threshold corresponding to the minimum back-off value from traffic queues of the another device. This feature allows to control access to the network by specific devices (active device) while other devices (passive device) may use a transmission slot obtained by a specific device according to the medium access mechanism.

Furthermore, the device comprises means for obtaining the minimum back-off value. The means may be an additional timeslot or a distributed mechanism. In any case, the addition transmission requirement is very limited since the additional timeslot is inserted in the timeslot obtained for the transmission.

In a specific embodiment, the access to the network is obtained by another device sharing a timeslot with the device. Furthermore, the means for adjusting at least one of the plurality of back-off engines is configured to prevent the back-off value of the at least one back-off engine to reach zero before a back-off value of said another device reaches zero. These features allow to control the access to the network by specific devices (active devices) which initiates the medium access, while other devices (passive devices) may use a transmission slot obtained by such specific device for the transmission of data.

In a particular embodiment, the controller comprises a scheduler implementing a time division access mechanism for a group of devices.

According to a second aspect of the invention, there is provided a method of sending data over a communication network by a communication device using a contention type access mechanism based on computation of back-off values and further using a plurality of traffic queues for serving data traffic at different priorities, the method comprising:
computing back-off values in accordance with the priority of each associated traffic queue;
adjusting at least one of the back-off values, thereby preventing the back-off value of the at least one traffic queue to reach zero; wherein, when an access to the network is obtained for the device:
selecting a traffic queue based on its associated back-off value; and
transmitting data from the selected traffic queue.

The access to the medium will therefore be controlled by preventing the communication device to trigger an access request to the communication network. Any access to the medium is prevented for transmitting the data comprised in the traffic queues until an access to the network is obtained for an active device.

These features allow to use only the traffic classification per priority mechanism (EDCA prioritization) while inhibiting the medium access mechanism (EDCA channel access). They further allow to use a traffic classification per priority mechanism (as EDCA prioritization) for filling a granted transmission opportunity (as TDMA transmission slot). Moreover, the node which grants the access to the device is not required to inform of the traffic queue to be used, allowing using standard messages for medium access by the active node.

According to an embodiment, the selecting step comprises selecting the traffic queue having the lowest associated back-off value.

According to another embodiment, the access to the network is implemented through an allocated timeslot and wherein the selecting step further comprises selecting at least one further traffic queue according to the duration of the allocated timeslot.

According to still another embodiment, the adjusting step comprises applying one or more offset values for adjusting the back-off values.

More specifically, the offset value/s is/are determined based on the minimum back-off value from traffic queues of another device having obtained an access to the network.

Furthermore, the access to the network is obtained by another device and the offset value/s is/are determined based on a back-off threshold corresponding to the minimum back-off value from traffic queues of said another device.

In a specific embodiment, the access to the network is obtained by another device sharing a timeslot with said communication device. Furthermore, the step of adjusting at least one of the of back-off values comprises preventing the back-off value of the at least one traffic queue to reach zero before a back-off value of the other device reaches zero.

In a particular embodiment, the method is implementing a time division access mechanism for a group of devices for transmitting data onto the network.

BRIEF DESCRIPTION OF THE DRAWINGS

Embodiments of the invention will now be described, by way of example only, and with reference to the following drawings in which:

FIGS. 3a, 3b and 3c illustrate the IEEE 802.11e EDCA involving access categories;

DETAILED DESCRIPTION OF EMBODIMENTS OF THE INVENTION

The invention provides communication methods and devices for data communication over a communication network, the physical medium of which being shared between a plurality of communication nodes or devices. An exemplary communication network is an IEEE 802.11e wireless ad-hoc network (and upper versions). The invention applies, at least, to any wireless network where a source node 101-107 sends data of a data stream to a receiving node 101-107 using a TDMA transmission scheme supporting QoS per priority, the network being accessible by communication devices using a contention type access mechanism. In the accompanying figures, the same elements are represented by the same reference numbers.

Figure 1:
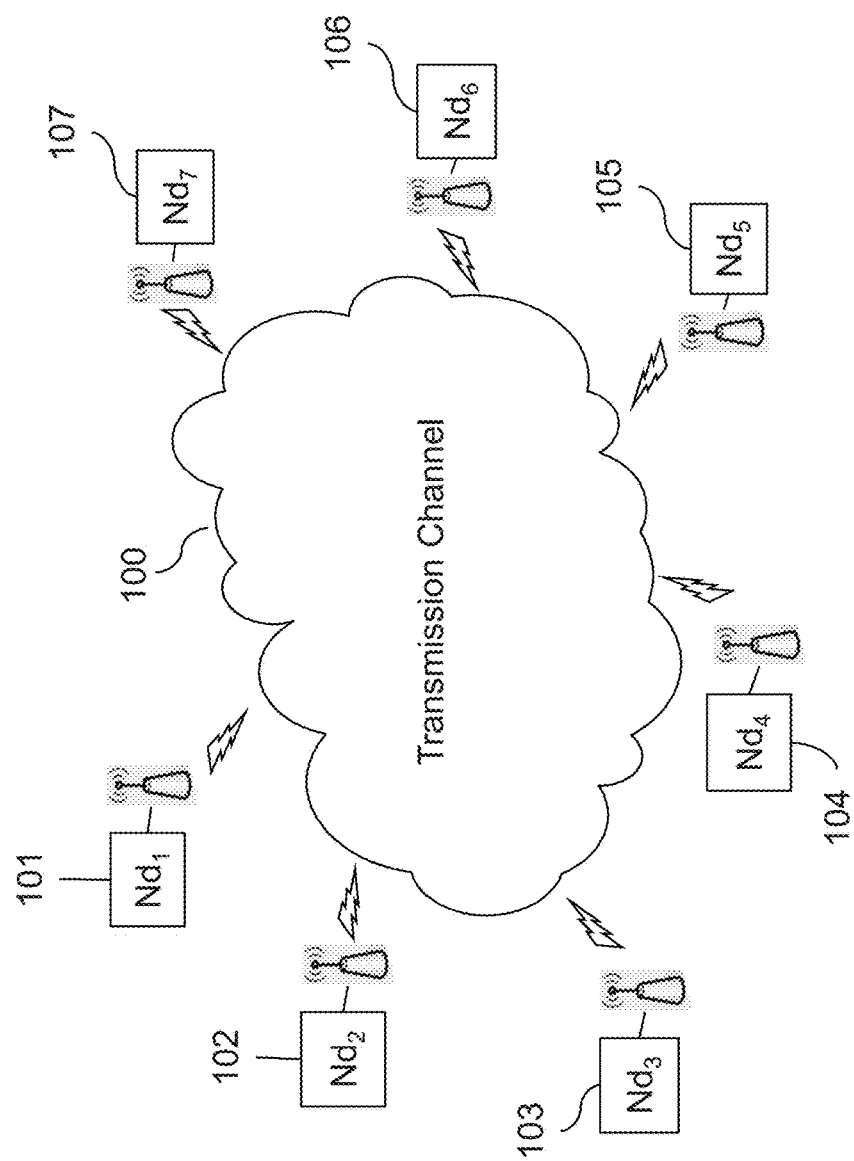
FIG. 1 illustrates a typical wireless communication system in which embodiments of the invention may be implemented.
Figure 2:
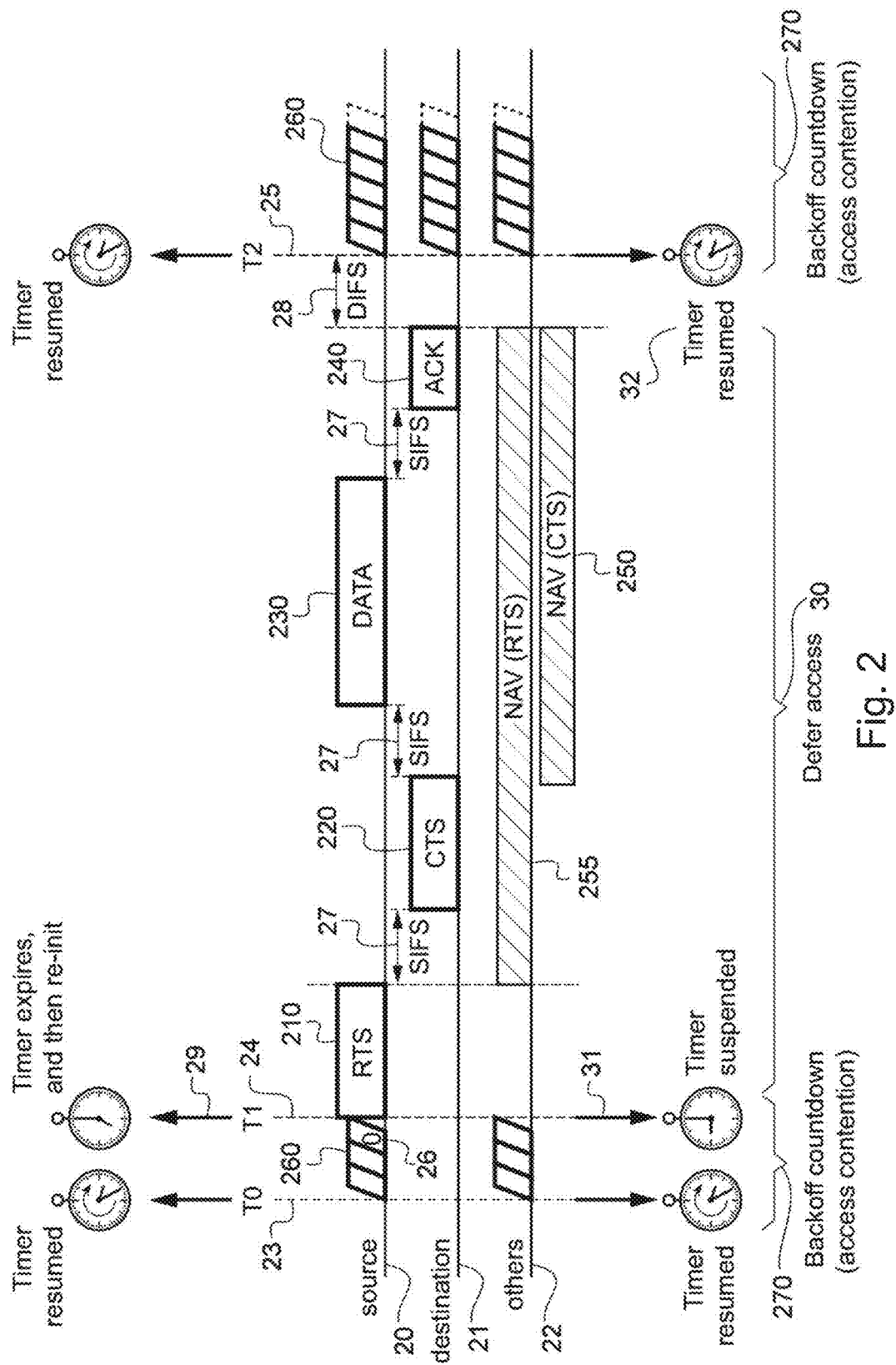
FIG. 2 is a timeline schematically illustrating a conventional communication mechanism according to the IEEE 802.11 standard.

The behaviour of communication nodes during a conventional communication over a 802.11 medium has been recalled above with reference to FIGS. 1 and 2, including the RTS/CTS four-way handshaking mechanism 210/220.

FIGS. 3a, 3b and 3c illustrate the IEEE 802.11e EDCA involving access categories.

In the IEEE 802.11e standard providing quality of service enhancements to make more efficient use of the wireless channel, an optional feature, called Block ACK (acknowledgment per block), allows two or more data frames 230 to be transmitted before a Block ACK frame is returned to acknowledge the receipt of the data frames. The Block ACK increases communication efficiency since only one signalling ACK frame is needed to acknowledge a block of frames, while every ACK frame originally used has a significant overhead for radio synchronization.

Block ACK is initiated through a setup and negotiation process between the transmitting or source node and the receiving node.

Once the Block ACK has been negotiated and established, multiple data frames can be transmitted in a contention free burst (or during the TXOP), with SIFS separation between the successive data frames. The Block ACK frame returned to the source node includes an acknowledgment bitmap, each information item (e.g. a bit) of which acknowledging the receipt of one of the data frames.

Another aspect that the IEEE 802.11e standard has improved regards the quality of service (QoS), for example latency of data traffic. In the original standard, a communication node includes only one transmission queue/buffer. However, since a subsequent data frame cannot be transmitted until the transmission/retransmission of a preceding frame ends, the delay in transmitting/retransmitting the preceding frame prevents the communication from having QoS.

The IEEE 802.11e has overturned this deficiency in providing quality of service (QoS) enhancements to make more efficient use of the wireless medium.

This standard relies on a coordination function, called hybrid coordination function (HCF), which has two modes of operation: enhanced distributed channel access (EDCA) and HCF controlled channel access (HCCA).

EDCA enhances or extends functionality of the original access DCF method: EDCA has been designed for support of prioritized traffic similar to DiffServ (Differentiated Services), which is a protocol for specifying and controlling network traffic by class so that certain types of traffic get precedence.

EDCA is the dominant channel access mechanism in WLANs because it features a distributed and easily deployed mechanism.

The above deficiency of failing to have satisfactory QoS due to delay in frame retransmission can be solved with a plurality of transmission queues/buffers.

QoS support in EDCA is achieved with the introduction of four Access Categories (ACs), and thereby of four corresponding transmission queues or buffers (310).

Each AC has its own transmission queue/buffer to store corresponding data frames to be transmitted on the network. The data frames, namely the MSDUs, incoming from an upper layer of the protocol stack are mapped onto one of the four AC queues/buffers and thus input in the mapped AC buffer.

Each AC has also its own set of channel access parameters, and is associated with a priority value, thus defining traffic of higher or lower priority of MSDUs.

That means that each AC (and corresponding buffer) acts as an independent DCF contending entity including its respective back-off engine 311. In other words, the ACs within the same communication node compete one with each other to access the wireless medium and to obtain a transmission opportunity, using the contention mechanism as explained above with reference to FIG. 2 for example.

Service differentiation between the ACs is achieved by setting different contention window parameters (CWmin, CWmax), arbitrary interframe spaces (AIFS), and transmission opportunity duration limits (TXOP_Limit).

With EDCA, high priority traffic has a higher chance of being sent than low priority traffic: a node with high priority traffic waits a little less (low CW) before it sends its packet, on average, than a node with low priority traffic.

The four AC buffers (310) are shown in FIG. 3*a*.

Buffers AC3 and AC2 are usually reserved for real-time applications (e.g., voice or video transmission). They have, respectively, the highest priority and the last-but-one highest priority.

Buffers AC1 and AC0 are reserved for best effort and background traffic. They have, respectively, the last-but-one lowest priority and the lowest priority.

Each data unit, MSDU, arriving at the MAC layer from an upper layer (e.g. Link layer) with a priority is mapped into an AC according to mapping rules. FIG. 3*b* shows an example of mapping between eight priorities of traffic class (User Priorities or UP, 0-7 according IEEE 802.1d) and the four ACs. The data frame is then stored in the buffer corresponding to the mapped AC.

When the back-off procedure of an AC ends, the MAC controller (reference 704 in FIG. 7 below) of the transmitting node transmits a data frame from this AC to the physical layer for transmission onto the wireless communication network.

Since the ACs operate concurrently in accessing the wireless medium, it may happen that two ACs of the same communication node have their back-off ending simultaneously. In such a situation, a virtual collision handler of the MAC controller operates a selection of the AC having the highest priority between the conflicting ACs, and gives up transmission of data frames from the ACs having lower priorities.

Then, the virtual collision handler commands those ACs having lower priorities to start again a back-off operation using an increased CW value.

FIG. 3*c* illustrates configurations of a header of a MAC data frame and a QoS control field (300) included in the header of the IEEE 802.11e MAC frame.

As represented in the Figure, the QoS control field 300 is made of two bytes, including the following information items:

Bits B0 to B3 are used to store a traffic identifier (TID) which identifies a traffic stream. The traffic identifier takes the value of the transmission priority value (User Priority UP, value between 0 and 7—see FIG. 3*b*) corresponding to the data conveyed by the data frame or takes the value of a traffic stream identifier (TSID, value between 8 and 15) for other data streams.

Bits B5 and B6 define the ack policy subfield which specifies the acknowledgment policy associated with the data frame. This subfield is used to determine how the data frame has to be acknowledged by the receiving node. Usually, it may take three different values as follows:

value equal to "Normal ACK" in the case where the transmitting or source node requires a conventional acknowledgment to be sent (by the receiving node) after a short interframe space (SIFS) period following the transmission of the data frame;

value equal to "No ACK" in the case where the source node does not require acknowledgment. That means that the receiving node takes no action upon receipt of the data frame; and value equal to "Block ACK" as defined above. The receiving node takes no action immediately upon receiving the data frame, except the action of recording the state of reception in its scoreboard context. With such a value, the source node is expected to send a Block ACK request (BAR) frame, to which the receiving node responds using the procedure described below.

The other bits B4 and B7-B15 are of less importance for embodiments of the present invention.

The present inventors have envisaged using TDMA (Time Division Multiple Access) transmission method allowing several nodes to send data on the medium while only one node have been granted opportunity to access the medium. TDMA here refers to a time division multiple access communication method used in conjunction with the 802.11 type MAC standard. Those several nodes form a group of peer nodes, also called collaborative nodes. It is envisaged that there will also exist nodes outside the collaborative group, referred to as legacy nodes. Even if the members of the collaborative group have no communication with the legacy nodes, the group needs to coexist with legacy nodes. A legacy environment typically reflects a situation where nodes are independent and do not interact nor cooperate with each other, as opposed to the collaborative group of nodes. A peer node may request access to the shared 802.11 type medium according to the 802.11 legacy protocol, and upon grant of access, the node may communicate with one or more peer nodes according to a collaborative protocol during the reserved talk time. Thus, if the back-off count reduces to zero for one peer node among the group, said node reserves medium access (through classical RTS/CTS scheme) for the group and lets the group share this granted 802.11 timeslot in a TDMA transmission scheme. The TDMA can be activated for specific wireless transmissions (like video streaming for instance).

Figure 4:
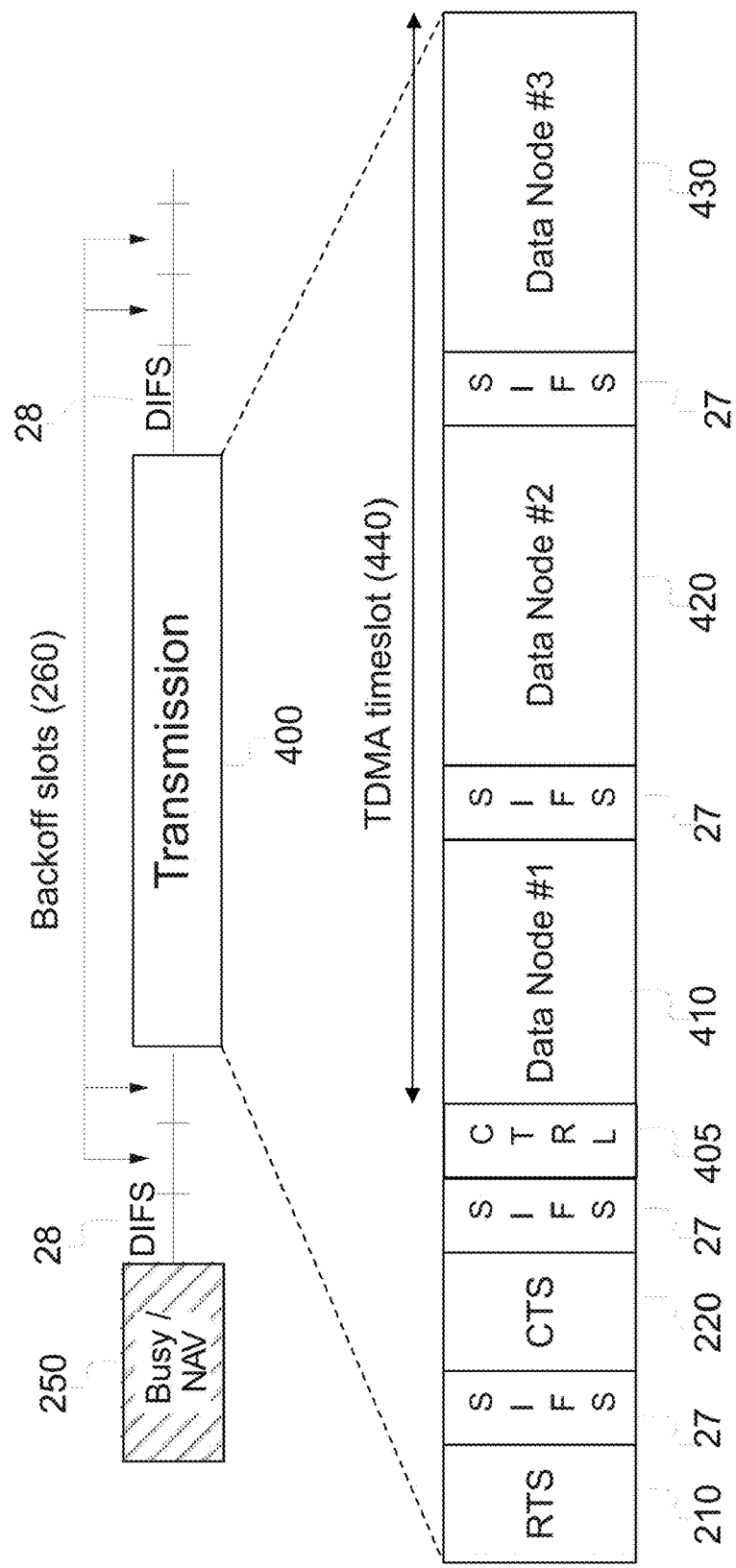
FIG. 4 illustrates a bandwidth sharing according to an embodiment of the present invention.

FIG. 4 illustrates a bandwidth sharing according to an embodiment of the invention.

In FIG. 4, the upper part describes the timeline of the FIG. 2 without acknowledgment. The TXOP transmission period 400 corresponding to the defer access 30 is described in more details in the lower part of the figure.

In this transmission scheme, the TXOP transmission time used to send the data 230 of the FIG. 2 comprises a TDMA timeslot 440, which is shared between three nodes into a TDMA slot 410 for node #1, a TDMA slot 420 for node #2 and a TDMA slot 430 for node #3. The three nodes form a collaborative group in view of sharing the bandwidth. After the medium is granted to the RTS sender, the three nodes will send data one after the other, each data transmission being preceded by a SIFS period 27 of waiting time to avoid collision between the nodes. The node requesting the medium access is an "active node" (as for example node #1), while the other nodes (as for example nodes #2 and #3) sending data in the timeslots provided by the active node are "passive nodes".

Thanks to this transmission scheme, each node of the collaborative group (three nodes in this example), have a transmission opportunity each time the medium is granted to one node of the group. The average latency and jitter is then greatly improved for the data transmissions of the nodes of the group.

In a particular embodiment, a timeslot 405 is added before the data timeslots 410 to 430. This additional timeslot 405 is dedicated to the transmission of control information from the current active node, which is the node initiating the medium access, to the passive nodes. An exemplary usage will be provided in regards to algorithm of FIG. 9.

Figure 5:
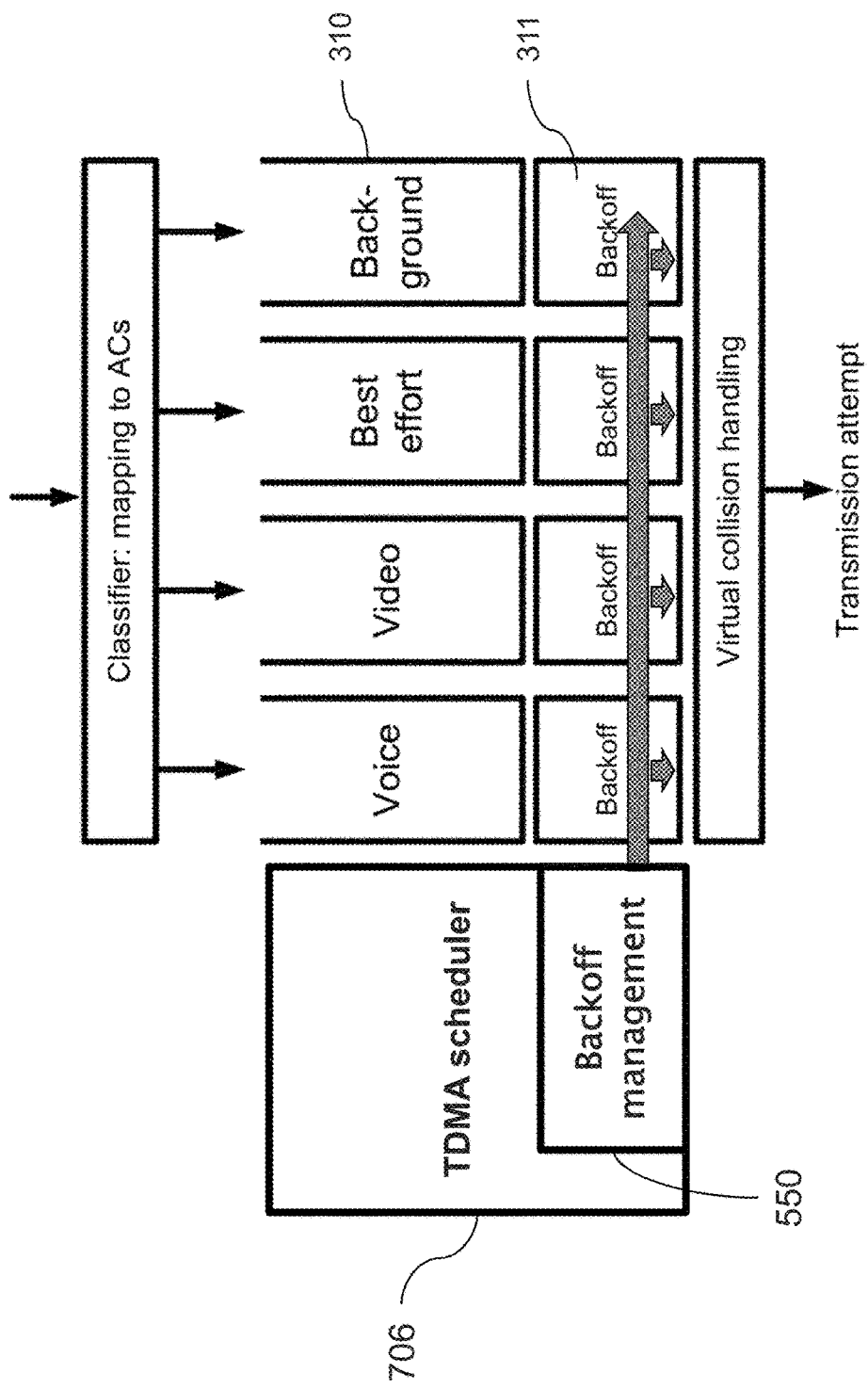
FIG. 5 illustrates an embodiment of the present invention in a block diagram form.

FIG. 5 illustrates an embodiment of the present invention and shows the enhancement over FIG. 3a.

There is provided a TDMA transmission scheme shared by a group of nodes, each node implementing a mechanism to determine when a TDMA timeslot 440 (inside a CSMA/CA TXOP) is granted to the node. This mechanism is implemented in a TDMA scheduler (bloc 706).

According to an embodiment of the invention, the classical TDMA scheduler 706 includes an additional mechanism in charge of back-off management (bloc 550). The back-off management consists in controlling the value of each AC back-off engine 311, in order to guaranty that no AC back-off elapses (reaches a zero value) while keeping the relative priority of the different queues.

As a result, no access to the medium will be triggered for the AC back-off engines preventing potential conflict with the group medium access scheme while the relative priority of the different queues is maintained.

The control is advantageously implemented by read and update of the back-off values so that adjusting the back-off values is implemented simply by overwriting AC register of back-off engines 311.

Figure 7:
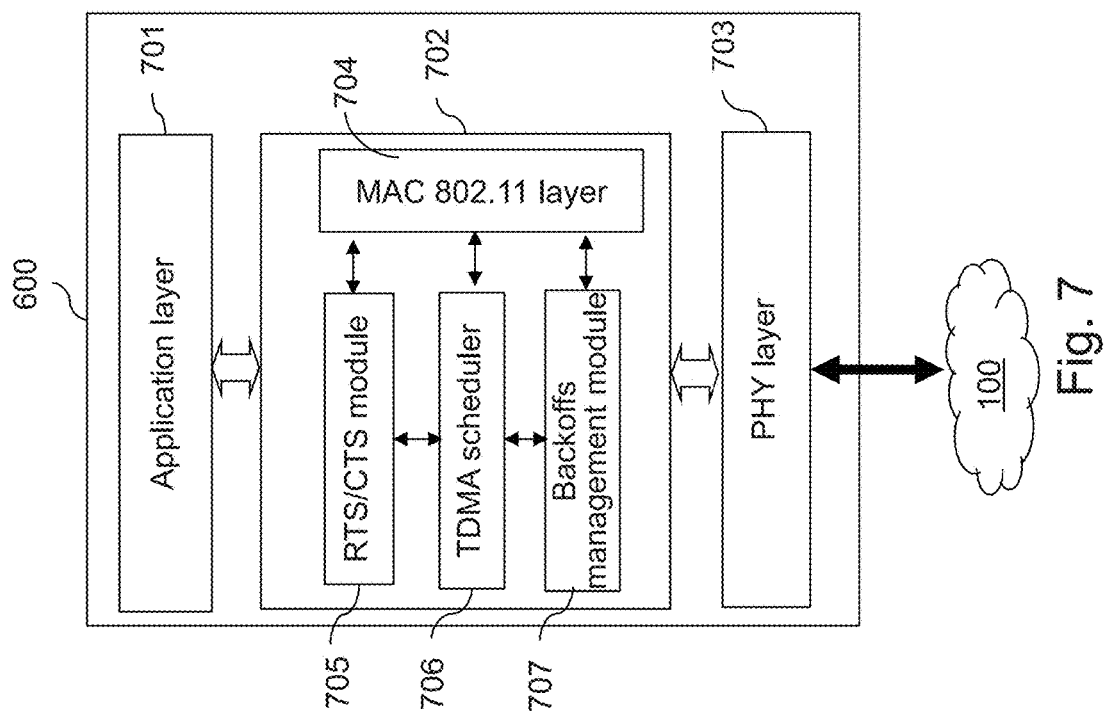
FIG. 7 illustrates function blocks of the same communication device.
Figure 8:
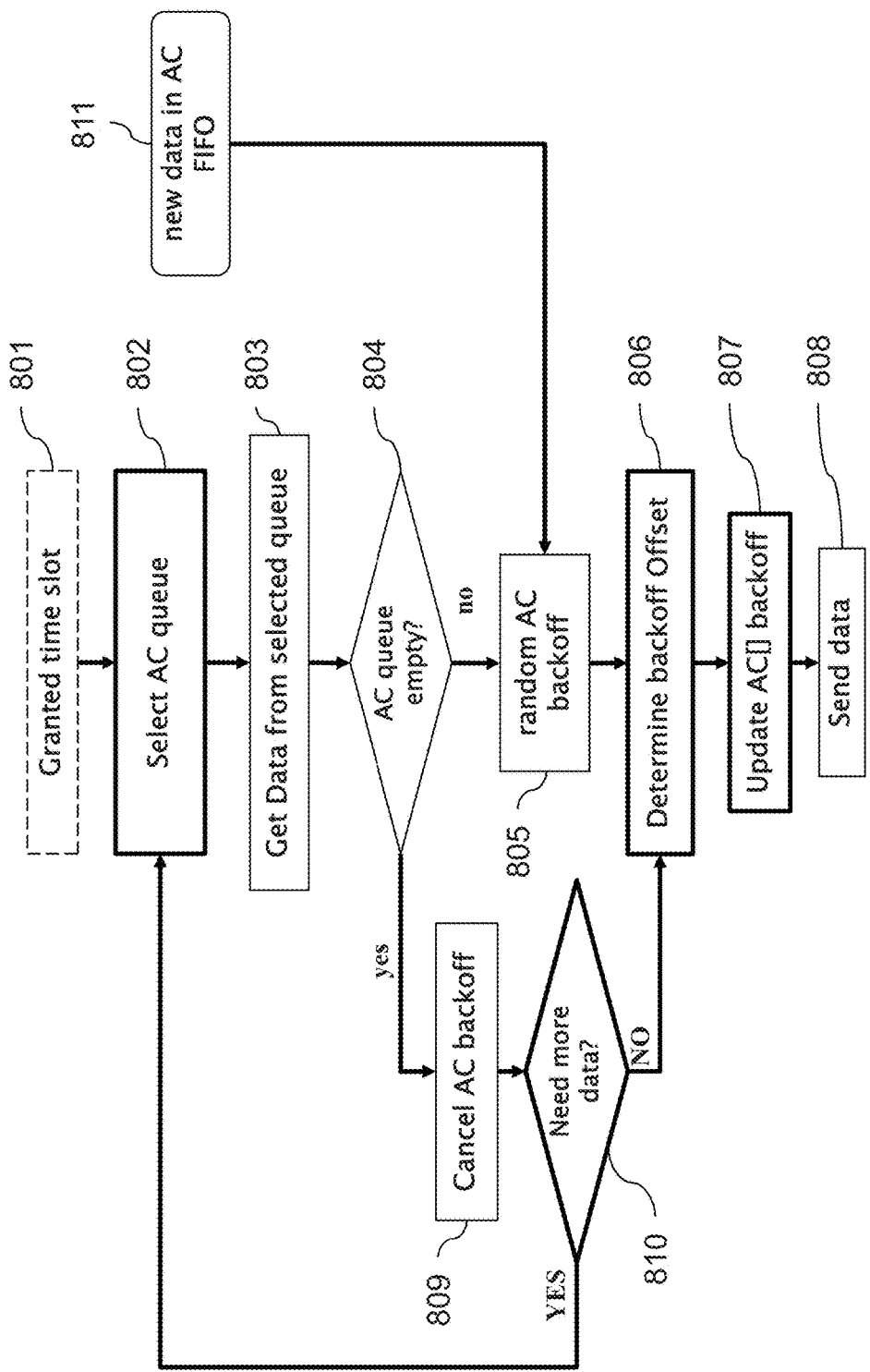
FIG. 8 is an algorithm illustrating an embodiment of the present invention.

Further advantages will become apparent in view of the detailed description of the back-off management module 707 in relation with FIGS. 7 and 8.

Figure 6:
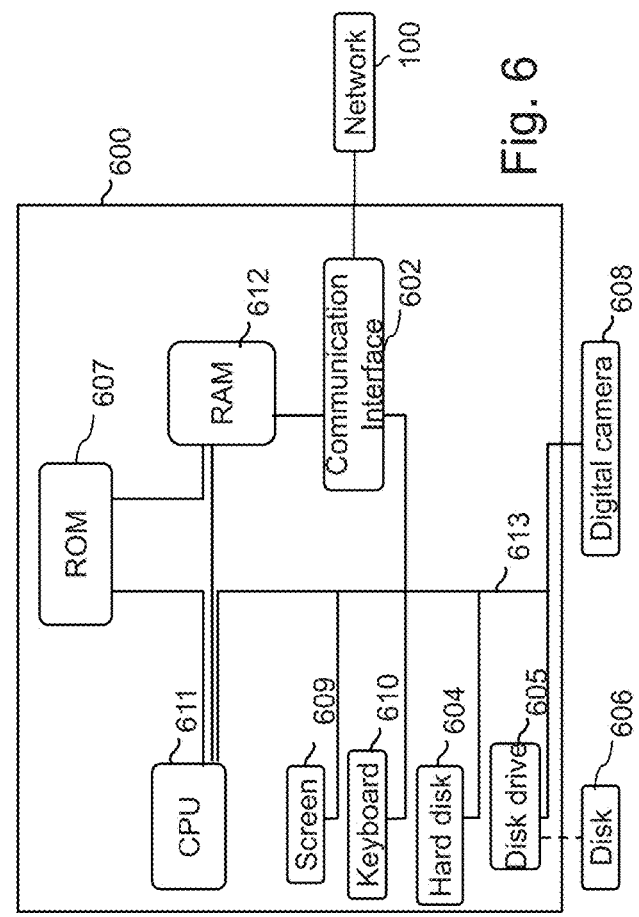
FIG. 6 is a block diagram illustrating components of a communication device in which embodiments of the invention may be implemented.

FIG. 6 schematically illustrates a communication device 600 of the radio network 100, configured to implement at least one embodiment of the present invention. The communication device 600 may be a device such as a microcomputer, a workstation or a light portable device. The communication device 600 comprises a communication bus 613 to which there are preferably connected:
- a central processing unit 611, such as a microprocessor, denoted CPU;
- a read only memory 607, denoted ROM, for storing computer programs for implementing the invention;
- a random access memory 612, denoted RAM, for storing the executable code of methods according to embodiments of the invention as well as the registers adapted to record variables and parameters necessary for implementing methods according to embodiments of the invention; and
- at least one communication interface 602 connected to the radio communication network 100 over which digital data packets or frames are transmitted, for example a wireless communication network according to the 802.11n protocol. The data frames and aggregated frames are written from a FIFO sending memory in RAM 612 to the network interface for transmission or are read from the network interface for reception and writing into a FIFO receiving memory in RAM 612 under the control of a software application running in the CPU 611.

Optionally, the communication device 600 may also include the following components:
- a data storage means 604 such as a hard disk, for storing computer programs for implementing methods according to one or more embodiments of the invention;
- a disk drive 605 for a disk 606, the disk drive being adapted to read data from the disk 606 or to write data onto said disk;
- a screen 609 for displaying decoded data and/or serving as a graphical interface with the user, by means of a keyboard 610 or any other pointing means.

The communication device 600 can be connected to various peripherals, such as for example a digital camera 608, each being connected to an input/output card (not shown) so as to supply data to the communication device 600.

The communication bus provides communication and interoperability between the various elements included in the communication device 600 or connected to it. The representation of the bus is not limiting and in particular the central processing unit is operable to communicate instructions to any element of the communication device 600 directly or by means of another element of the communication device 600.

The disk 606 can be replaced by any information medium such as for example a compact disk (CD-ROM), rewritable or not, a ZIP disk, a USB key or a memory card and, in general terms, by an information storage means that can be read by a microcomputer or by a microprocessor, integrated or not into the device, possibly removable and adapted to store one or more programs whose execution enables a method according to the invention to be implemented.

The executable code may be stored either in read only memory 607, on the hard disk 604 or on a removable digital medium such as for example a disk 606 as described previously. According to a variant, the executable code of the programs can be received by means of the communication network 100, via the interface 602, in order to be stored in one of the storage means of the communication device 600, such as the hard disk 604, before being executed.

The central processing unit 611 is adapted to control and direct the execution of the instructions or portions of software code of the program or programs according to the invention, which instructions are stored in one of the aforementioned storage means. On powering up, the program or programs that are stored in a non-volatile memory, for example on the hard disk 604 or in the read only memory 607, are transferred into the random access memory 612, which then contains the executable code of the program or programs, as well as registers for storing the variables and parameters necessary for implementing the invention.

In the embodiment illustrated in FIG. 6, the device is a programmable apparatus which uses software to implement the invention. However, alternatively, the present invention may be implemented in hardware (for example, in the form of an Application Specific Integrated Circuit or ASIC).

FIG. 7 is a block diagram schematically illustrating the architecture of a communication device or node 600 adapted to carry out, at least partially, the invention. As illustrated, node 600 comprises a physical (PHY) layer block 703, a MAC layer block 702, and an application layer block 701.

The PHY layer block 703 (here a 802.11 standardized PHY layer) has the task of formatting and sending or receiving frames over the radio medium used 100, such as a medium access request of the RTS type to reserve a TXOP transmission slot, a medium access response of the CTS type to acknowledge reservation of a TXOP transmission slot, as well as of MAC data frames and aggregated frames to/from that radio medium.

The MAC layer block or controller 702 comprises a standard MAC 802.11 layer 704 and three additional blocks 705 to 707 for carrying out, at least partially, the invention. The MAC layer block 702 may be implemented in software, which software is loaded into RAM 612 and executed by CPU 611.

The RTS/CTS module 705 has the task of managing Request-To-Send (RTS) and Clear-To-Send (CTS) messages.

The TDMA scheduler 706 implements a TDMA transmission scheme.

The back-off management module 707 mainly implements the algorithm according to an embodiment of the invention, related to adjusting the EDCA back-off values of 802.11 MAC layer entity 704.

Finally, the application layer block 701 implements an application that generates and receives data packets, for example data packets of a video stream. The application layer block 701 represents all the stack layers above MAC layer according ISO standardization.

FIG. 8 represents an algorithm of management of the AC back-offs, implemented by the back-off management module 707, in accordance with an embodiment of the present invention. This algorithm is executed by the passive nodes.

A first entry step 801 is executed when a transmission timeslot is granted to an active node for transmitting data. This step is an addition to the standard 802.11e EDCA mechanism. As stated before, an active node has taken the medium access through RTS/CTS handshake and is offering a TDMA transmission scheme for itself and for passive nodes during the granted TXOP. Basically, all mechanisms providing a TDMA transmission on top of a 802.11 EDCA may be used, as for example, a time based fixed TDMA wherein each node access the medium at some predefined instant and in a given order.

According to step 802, an AC queue is selected according to its associated back-off value reflecting the higher priority among the AC queues. A selected queue is necessarily a non-empty queue since an empty queue has no back-off value. The selected queue is preferably the queue having the smallest AC back-off. A particular mechanism, which is specified in steps 806 and 807, prevents any AC back-off to reach the zero value. Therefore, any medium access request is prevented for the AC queues, since the AC back-off will never come to zero at the moment the medium is granted. Step 802 thus determines the AC queue from which the data will come to be transmitted in the granted timeslot. Step 802 remains therefore compatible with the EDCA mechanism, in such a way the EDCA prioritization is kept for data selection whereas no medium access request can be issued by any AC back-off engine or unit 311.

In a classical EDCA mechanism, a medium access request is triggered at a given node for one AC queue having its AC back-off reaching zero. One can note that the selection step 802 in combination with steps 806-807 differs from standard, in that no back-off engine 311 reaches a null value for determining the current AC queue.

Then, in step 803 the data is obtained and removed from the selected AC queue and placed in a transmission buffer for transmission according to the amount of data that can be transmitted in the granted timeslot. The maximum amount of data that is to be placed in the transmission buffer for transmission is directly determined by the length (time) of the timeslot and the transmission rate.

A check 804 determines if the selected AC queue is empty. If the selected queue is empty after the data have been removed from the queue in step 803, then the corresponding AC back-off is cancelled in step 809. Indeed, since the queue contains no more data to manage, there is no need to take this queue into account in the priority handling.

A test 810 determines if there is still room for additional data to be transmitted, which situation occurs when the amount of data in the selected AC queue is lower than the amount of data that can be transmitted in the granted timeslot. Step 810 is also new regarding the classical EDCA mechanism, since in the classical EDCA mechanism, the transmission time requested in the RTS message is determined by the amount of data to transmit from the corresponding AC queue. Therefore, in the classical EDCA mechanism only stored data from one AC queue can be sent at a time. The additional step 810 allows thus to improve the usage of the bandwidth by filling the granted timeslot with additional data from another AC queue.

If test 810 determines that there is still room for additional data to be transmitted, step 802 is executed, and a new AC queue is selected, otherwise, step 806 is executed.

If check 804 determines that the selected AC queue is not empty after having obtained the data, step 805 is executed.

Step 805 randomly selects a new back-off value for the selected AC queue.

Then step 806 is executed to ensure that no AC back-off value will expire before the next transmission opportunity (i.e. the next TXOP supporting a TDMA timeslot 440). To avoid one of the AC back-offs to reach zero before said further TDMA timeslot is granted, step 806 determine an offset value that will be added to at least one, preferably to all the AC back-off values in the step 807. Step 806 will be explained in more detail with reference to the FIG. 9.

Finally, at step 808, the data of the transmission buffer is send to the medium.

A second entry step 811 of the algorithm is executed when a new data is added to an empty AC queue. In this case in step 805 a random back-off is computed corresponding to the priority of the data for this queue. Then steps 806 to 807 are executed as specified above. Step 808 is not executed, since the transmission buffer is still empty at this stage.

Figure 9:
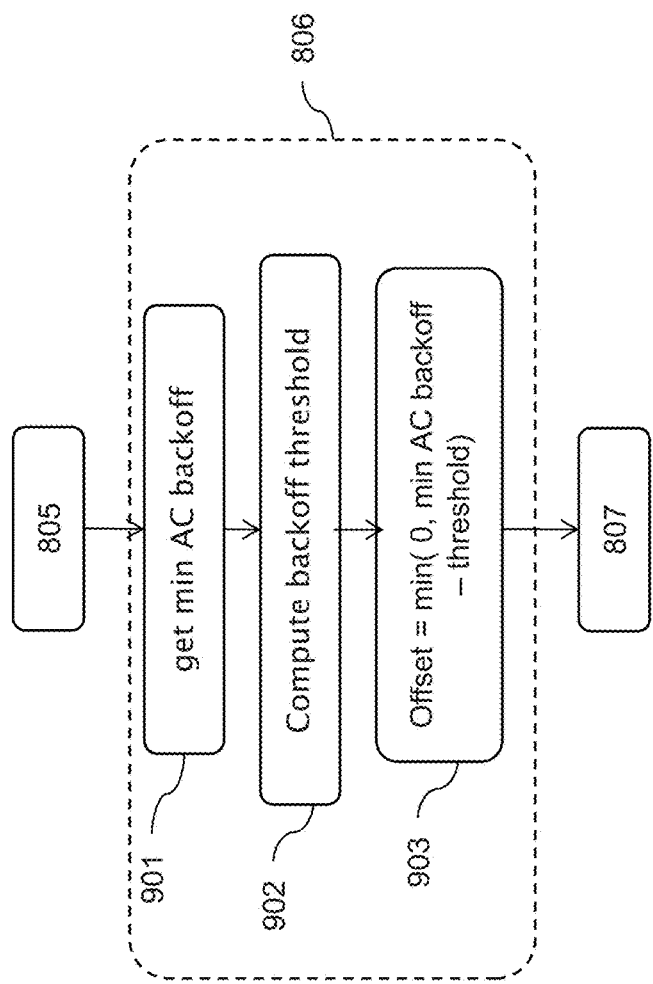
FIG. 9 details the algorithm of FIG. 8 according to a specific embodiment of the present invention.

FIG. 9 details the step 806 of FIG. 8 according to a specific embodiment of the present invention in order to determine an offset to be applied to the AC back-off (of FIG. 8).

First, in step 901, the smallest AC back-off value (MIN-BACK) among AC back-off engine/s is determined for the current passive node.

Then in step 902 a back-off threshold value (BACKTHR) is computed. The back-off threshold corresponds to the minimal value among the AC back-off counters of the active nodes of the group. This value corresponds to the time of the next transmission opportunity for the group of nodes. Basically, any threshold value preventing one of the AC back-off of the passive nodes to reach zero before the next TDMA timeslot is granted may be computed. For example, the back-off threshold value (BACKTHR) may be set with the maximum value provided by a back-off generator corresponding to the maximum back-off window size plus one.

In a particular embodiment, each active node sends the minimal value of its AC back-off each time it accesses the medium, for example by adding this information in the timeslot 405 dedicated to the control at the beginning of the TDMA (see FIG. 4). In this embodiment, the passive nodes store the value sent by each active node and updates this value each time an active node starts a new TDMA. Each passive node updates the value for the current active node (i.e. an active node at the origin of the current TDMA) by firstly temporary storing the current value of the AC back-off of the current active node, and then updating the stored value for the current active node with its newly transmitted value. Each passive node can then update the stored value for the other active nodes by subtracting the temporary stored value to each stored value (except the value corresponding to the current active node). The back-off threshold can then be determined as being the smallest stored value plus one.

In an alternative embodiment the minimal value of the AC back-of may be determined by the passive node by a distributed method as illustrated for example in WO2012160474.

Step 903 then computes the offset values that will be added to each AC back-off in step 807. If this value is negative, the offset is set to zero. The offset is equal to the BACKTHR−MINBACK. This feature ensures that all the active nodes of the group (or alternatively, at least one active node being the next active node to request a medium access) will have a smaller back-off value with respect to the passive nodes, so that at least one of the active nodes (i.e. a node requesting a medium access and then sharing the granted medium access with the passive nodes) will try to access the medium before any of the AC back-off counters of the current passive node reaches zero.

As this set of steps 806 is performed by each passive node of the group, there is no risk that any passive node engages a medium access request for the group.

The invention claimed is:

1. A first communication device for a communication network, comprising:
   a plurality of data queues for serving data at different priorities;
   a controller for computing back-off values associated with priority, each back-off value corresponding to a respective one of the plurality of data queues, the controller further for accessing the communication network using contention type access mechanism based on the computed back-off values;
   a memory; and
   at least one processor that is coupled to the memory and that is configured to cause the first communication device
   to select a data queue based on a non-zero back-off value corresponding to the data queue, responsive to an obtaining by the first communication device of a transmission opportunity for transmitting data, from among transmission opportunities obtained by another communication device and granted to one or more communication devices belonging to the communication network; and
   to transmit data from the selected data queue in the obtained transmission opportunity even though the back-off value corresponding to the selected data queue of the plurality of data queues is not zero.

2. The first communication device according to claim 1, wherein the at least one processor is configured to cause the first communication device to select the data queue having a lowest associated back-off value.

3. The first communication device according to claim 1, wherein the access to the communication network being implemented through an allocated timeslot, and wherein the at least one processor is configured to cause the first communication device to select at least one further data queue according to the duration of the allocated timeslot.

4. The first communication device according to claim 1, wherein the at least one processor is configured to cause the first communication device to apply one or more offset values for adjusting the at least one adjustable back-off engine.

5. The first communication device according to claim 4, wherein the access to the communication network being obtained by the other communication device, and wherein the one or more offset values is/are determined based on a back-off threshold corresponding to the minimum back-off value from data queues of the other communication device.

6. The first communication device according to claim 5, wherein the first communication device comprises means for obtaining said minimum back-off value.

7. The first communication device according to claim 1, wherein the access to the communication network is obtained by the other communication device sharing a timeslot with the first communication device.

8. The first communication device according to claim 7, wherein the at least one processor is configured to cause the first communication device to prevent the back-off value of the at least one back-off engine to reach zero before a back-off value of the other communication device reaches zero.

9. The first communication device of claim 1, wherein the controller comprises a scheduler implementing a time division access mechanism for a group of devices.

10. A method of sending data over a communication network by a first communication device using a plurality of data queues for serving data at different priorities and using a controller for accessing the communication network using contention type access mechanism based on computed back-off values, the method comprising:
computing back-off values associated with priority, each back-off value corresponding to a respective one of the plurality of data queues;
selecting a data queue based on a non-zero back-off value corresponding to the data queue, responsive to an obtaining by the first communication device of a transmission opportunity for transmitting data, from among transmission opportunities obtained by another communication device and granted to one or more communication devices belonging to the communication network; and
transmitting data from the selected data queue in the obtained transmission opportunity even though the back-off value corresponding to the selected data queue of the plurality of data queues is not zero.

11. The method according to claim 10, wherein the selecting step comprises selecting the data queue having a lowest associated back-off value.

12. The method according to claim 10, wherein the access to the communication network is implemented through an allocated timeslot and wherein the selecting step further comprises selecting at least one further data queue according to the duration of the allocated timeslot.

13. The method according to claim 10, further comprising applying one or more offset values for adjusting the back-off values.

14. The method according to claim 13, wherein the access to the communication network is obtained by the other communication device and wherein the one or more offset values is/are determined based on the minimum back-off value from data queues of the other communication device.

15. The method according to claim 14, wherein said minimum back-off value is obtained though an additional timeslot inserted in a timeslot obtained for the transmission or by a distributed mechanism.

16. The method according to claim 10, wherein the access to the communication network is obtained by the other communication device sharing a timeslot with the first communication device.

17. The method according to claim 16 further comprising preventing the back-off value of the at least one traffic queue to reach zero before a back-off value of the other communication device reaches zero.

18. The method according to claim 10, implementing a time division access mechanism for a group of devices for transmitting data onto the communication network.

19. A non-transitory computer-readable medium storing a program which, when executed by a microprocessor or computer system in a first communication device of a communication network, causes the first communication device to perform a method of sending data over the communication network, the method using a plurality of data queues for serving data at different priorities and using a controller for accessing the communication network using contention type access mechanism based on computed back-off values, the method comprising:
computing back-off values associated with priority, each back-off value corresponding to a respective one of the plurality of data queues;
selecting a data queue based on a non-zero back-off value corresponding to the data queue, responsive to an obtaining by the first communication device of a transmission opportunity for transmitting data, from among transmission opportunities obtained by another communication device and granted to one or more communication devices belonging to the communication network; and
transmitting data from the selected data queue in the obtained transmission opportunity even though the back-off value corresponding to the selected data queue of the plurality of data queues is not zero.

* * * * *